(12) United States Patent
Mehrnia et al.

(10) Patent No.: US 11,817,894 B2
(45) Date of Patent: *Nov. 14, 2023

(54) CHANNEL EXTRACTION DIGITAL BEAMFORMING

(71) Applicant: Space Exploration Technologies Corp., Hawthorne, CA (US)

(72) Inventors: Alireza Mehrnia, Tustin, CA (US); Masoud Kahrizi, Irvine, CA (US); Alex Ahmad Mirzaei, Tustin, CA (US); Bagher Afshar, Irvine, CA (US); Ali Sajjadi, Irvine, CA (US); Bernd Pregardier, Oceanside, CA (US); Ka Shun Carson Pun, Irvine, CA (US); Omid Nasiby, Laguna Niguel, CA (US); Igor Elgorriaga, Rancho Palos Verdes, CA (US)

(73) Assignee: Space Exploration Technologies Corp., Hawthorne, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/944,041

(22) Filed: Sep. 13, 2022

(65) Prior Publication Data

US 2023/0006706 A1    Jan. 5, 2023

Related U.S. Application Data

(63) Continuation of application No. 17/193,633, filed on Mar. 5, 2021, now Pat. No. 11,483,021, which is a continuation of application No. 16/865,402, filed on May 3, 2020, now Pat. No. 10,944,442.

(60) Provisional application No. 62/847,554, filed on May 14, 2019.

(51) Int. Cl.
  *H04B 1/16*   (2006.01)
  *H04L 7/00*   (2006.01)
  *H04B 7/08*   (2006.01)

(52) U.S. Cl.
  CPC ............... *H04B 1/16* (2013.01); *H04B 7/08* (2013.01); *H04L 7/0033* (2013.01)

(58) Field of Classification Search
  CPC ............ H04B 1/16; H04B 7/08; H04L 7/0033
  USPC ........................................................ 375/340
  See application file for complete search history.

(56) References Cited

U.S. PATENT DOCUMENTS

| | | | |
|---|---|---|---|
| 5,619,503 A | 4/1997 | Dent | |
| 6,151,328 A | 11/2000 | Kwon et al. | |
| 7,076,228 B1 | 7/2006 | Rilling | |
| 8,260,143 B2 | 9/2012 | Gupta et al. | |
| 1,094,442 A1 | 3/2021 | Mehrnia et al. | |
| 11,483,021 B2 * | 10/2022 | Mehrnia | H04B 7/0897 |
| 2004/0213351 A1 | 10/2004 | Shattil | |
| 2015/0188582 A1 | 7/2015 | Kahrizi et al. | |
| 2016/0211998 A1 | 7/2016 | Sun et al. | |
| 2018/0323830 A1 | 11/2018 | Park et al. | |

(Continued)

*Primary Examiner* — Don N Vo
(74) *Attorney, Agent, or Firm* — Polsinelli PC

(57) ABSTRACT

In an embodiment, a receiver included in a communications system includes a channel extractor configured to segregate a received signal into a plurality of channel signals, wherein the plurality of channel signals includes a plurality of data signals; and a plurality of decoders electrically coupled to the channel extractor and configured to decode each of the plurality of channel signals into a respective plurality of decoded data beam portions.

21 Claims, 9 Drawing Sheets

(56) References Cited

U.S. PATENT DOCUMENTS

2019/0049575 A1 2/2019 Ranney et al.

\* cited by examiner

CHANNEL EXTRACTION DIGITAL BEAMFORMING

CROSS-REFERENCES TO RELATED APPLICATIONS

The present application is a continuation of U.S. patent application Ser. No. 17/193,633, filed Mar. 5, 2021, which is a continuation of U.S. patent application Ser. No. 16/865,402, filed May 3, 2020, now U.S. Pat. No. 10,944,442, which claims priority to U.S. Provisional Patent Application No. 62/847,554 filed May 14, 2019 entitled "Channel Extraction Digital Beamforming," the contents of which are expressly hereby incorporated by reference in their entirety.

BACKGROUND

An antenna (such as a dipole antenna) typically generates radiation in a pattern that has a preferred direction. For example, the generated radiation pattern is stronger in some directions and weaker in other directions. Likewise, when receiving electromagnetic signals, the antenna has the same preferred direction. Signal quality (e.g., signal to noise ratio or SNR), whether in transmitting or receiving scenarios, can be improved by aligning the preferred direction of the antenna with a direction of the target or source of the signal. However, it is often impractical to physically reorient the antenna with respect to the target or source of the signal. Additionally, the exact location of the source/target may not be known. To overcome some of the above shortcomings of the antenna, a phased array antenna can be formed from a set of antenna elements to simulate a large directional antenna. An advantage of a phased array antenna is its ability to transmit and/or receive signals in a preferred direction (e.g., the antenna's beamforming ability) without physical repositioning or reorientating.

It would be advantageous to configure phased array antennas having increased bandwidth while maintaining a high ratio of the main lobe power to the side lobe power. Likewise, it would be advantageous to configure phased array antennas and associated circuitry having reduced weight, reduced size, lower manufacturing cost, and/or lower power requirements. Accordingly, embodiments of the present disclosure are directed to these and other improvements in phase array antenna systems or portions thereof.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In some embodiments, an apparatus includes a radio frequency (RF) receiver section configured to receive a RF signal from an antenna of a phased array antenna, the RF signal comprising a plurality of channels and a plurality of data beams per channel, wherein the RF receiver section includes an analog-to-digital converter (ADC) and a mixer; a first channel separator electrically coupled with the RF receiver section and configured to generate a plurality of channel signals based on the RF signal, wherein the plurality of channel signals comprises separation of the RF signal into the plurality of channels; a plurality of phase shifters electrically coupled to the first channel separator and configured to decode each data beam of the plurality of channel signals with a respective phase; and a plurality of time delay filters electrically coupled to the plurality of phase shifters and configured to decode each data beam of the plurality of channel signals with a respective time delay, wherein the plurality of time delay filters outputs the plurality of data beams of the plurality of channels.

In some embodiments, an apparatus includes a channel separator configured to separate a digitized radio frequency (RF) signal received by an antenna of a phased array antenna into a plurality of channel signals, wherein the digitized RF signal is based on an analog RF signal received by the antenna, and the analog RF signal comprises a plurality of channels and a plurality of data beams is included in each channel of the plurality of channels; a plurality of phase shifters electrically coupled to the channel separator and configured to decode each data beam of the plurality of channel signals with a respective phase; and a plurality of time delay filters electrically coupled to the plurality of phase shifters and configured to decode each data beam of the plurality of channel signals with a respective time delay, wherein the plurality of time delay filters outputs the plurality of data beams of the plurality of channels.

In some embodiments, a method includes, in response to receiving a radio frequency (RF) signal from an antenna of a phase array antenna, down converting and digitizing the RF signal to generate a digitized signal, wherein the RF signal comprises a plurality of channels and a plurality of data beams is included in each channel of the plurality of channels; segregating each channel of the plurality of channels from the digitized signal; decoding each data beam included in the plurality of channels with a respective phase; and decoding each data beam included in the plurality of channels with a respective time delay.

In some embodiments, an apparatus includes a radio frequency (RF) receiver section configured to receive a RF signal from an antenna of a phased array antenna, the RF signal comprising at least a portion of a plurality of data beams included in a single channel; a first channel separator electrically coupled with the RF receiver section and configured to generate a plurality of channel signals based on the RF signal, wherein the plurality of channel signals comprises separation of the RF signal into a plurality of channels in which each channel of the plurality of channels includes at least a portion of a respective subset of the plurality of data beams; a plurality of phase shifters electrically coupled to the first channel separator and configured to decode each data beam of the plurality of channel signals with a respective phase; and a plurality of time delay filters electrically coupled to the plurality of phase shifters and configured to decode each data beam of the plurality of channel signals with a respective time delay, wherein the plurality of time delay filters outputs the plurality of data beams of the plurality of channels.

In some embodiments, an apparatus includes a radio frequency (RF) receiver section configured to receive a RF signal from an antenna of a phased array antenna, the RF signal comprising at least a portion a plurality of data beams in a single channel; a first channel separator electrically coupled with the RF receiver section and configured to generate a plurality of channel signals based on the RF signal, wherein the plurality of channel signals comprises separation of the RF signal into a plurality of channels in which each channel of the plurality of channels includes at least a portion of a respective subset of the plurality of data beams; and a plurality of decoders electrically coupled to the first channel separator and configured to decode each of the plurality of channel signals into a respective plurality of decoded data beam portions.

In some embodiments, a receiver included in a communications system includes a channel extractor configured to segregate a received signal comprising a single channel including a plurality of data signals into a plurality of channel signals, wherein the plurality of channel signals includes a plurality of data signals, each channel of the plurality of channels including more than one data signal of the plurality of data signals; and a plurality of decoders electrically coupled to the channel extractor and configured to decode each of the plurality of channel signals into a respective plurality of decoded data beam portions.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
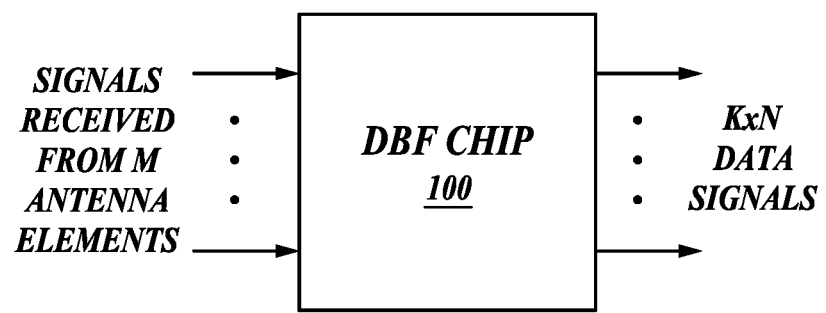
FIG. 1 is an example illustration of a digital beamformer (DBF) chip included in a phased array antenna system in accordance with some embodiments of the present disclosure.

Embodiments of apparatuses and methods relate to channel extraction digital beamforming. In an embodiment, a receiver included in a communications system includes a channel extractor configured to segregate a received signal into a plurality of channel signals, wherein the plurality of channel signals includes a plurality of data signals, wherein the received signal comprises a single channel including the plurality of data signals, and wherein the received signal is to be configured for transmission as the single channel based on the plurality of data signals included in a plurality of channels, each channel of the plurality of channels including more than one data signal of the plurality of data signals; a plurality of phase shifters electrically coupled to the channel extractor and configured to decode each data signal of the plurality of data signals with a respective phase; and a plurality of time delay filters electrically coupled to the plurality of phase shifters and configured to decode each data signal of the plurality of data signals with a respective time delay, wherein the plurality of time delay filters outputs each subset of the plurality of data signals in a respective channel of the plurality of channels. These and other aspects of the present disclosure will be more fully described below.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. Additionally, it should be appreciated that items included in a list in the form of "at least one A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C).

Language such as "top surface", "bottom surface", "vertical", "horizontal", and "lateral" in the present disclosure is meant to provide orientation for the reader with reference to the drawings and is not intended to be the required orientation of the components or to impart orientation limitations into the claims.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, it may not be included or may be combined with other features.

Many embodiments of the technology described herein may take the form of computer—or controller—executable instructions, including routines executed by a programmable computer or controller. Those skilled in the relevant art will appreciate that the technology can be practiced on computer/ controller systems other than those shown and described above. The technology can be embodied in a special-purpose computer, controller or data processor that is specifically programmed, configured or constructed to perform one or more of the computer-executable instructions described above. Accordingly, the terms "computer" and "controller"

as generally used herein refer to any data processor and can include Internet appliances and hand-held devices (including palm-top computers, wearable computers, cellular or mobile phones, multi-processor systems, processor-based or programmable consumer electronics, network computers, mini computers and the like). Information handled by these computers can be presented at any suitable display medium, including an organic light emitting diode (OLED) display or liquid crystal display (LCD).

Figure 7:
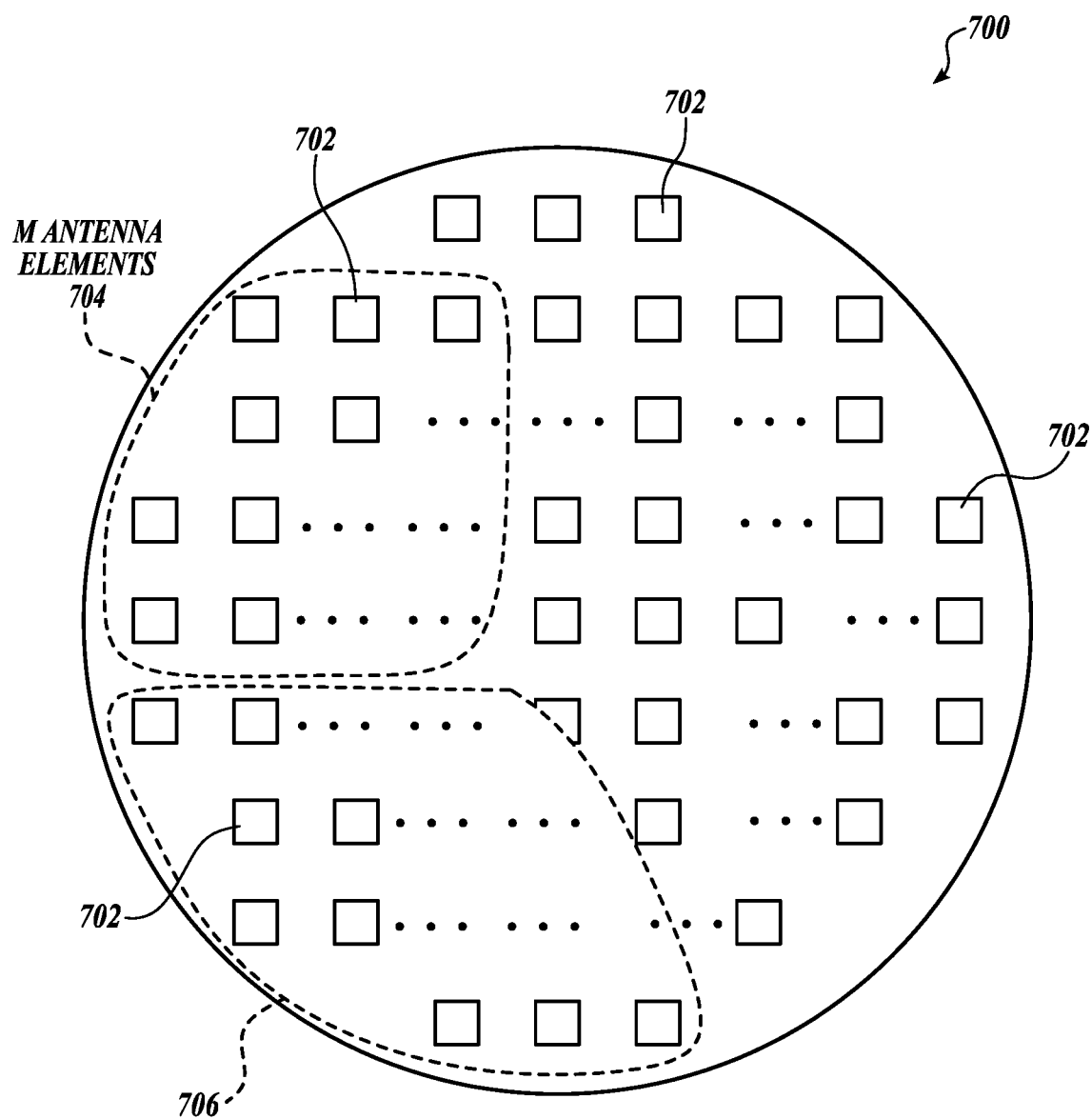
FIG. 7 is an example illustration of a top view of an antenna lattice in accordance with some embodiments of the present disclosure.

FIG. 1 is an example illustration of a digital beamformer (DBF) chip 100 included in a phased array antenna system in accordance with some embodiments of the present disclosure. DBF chip 100 comprises part of a receiver or receiver panel of the phased array antenna system. In an embodiment, DBF chip 100 comprises a single integrated circuit (IC) chip package including a plurality of pins, in which at least a first subset of the plurality of pins is configured to receive radio frequency (RF) signals from M number of antenna elements included in an antenna lattice of the phased array antenna system and a second subset of the plurality of pins is configured to output K number of channels, each of the channels including N number of data beams (for a total output of K x N number of data beams). K is equal to or greater than 2. FIG. 7 is an example illustration of a top view of an antenna lattice 700 in accordance with some embodiments of the present disclosure. Antenna lattice 700 (also referred to as a phased array antenna) includes a plurality of antenna elements 702 arranged in a particular pattern. A subset 704 of the plurality of antenna elements 702 comprises the M antenna elements.

Figure 2:
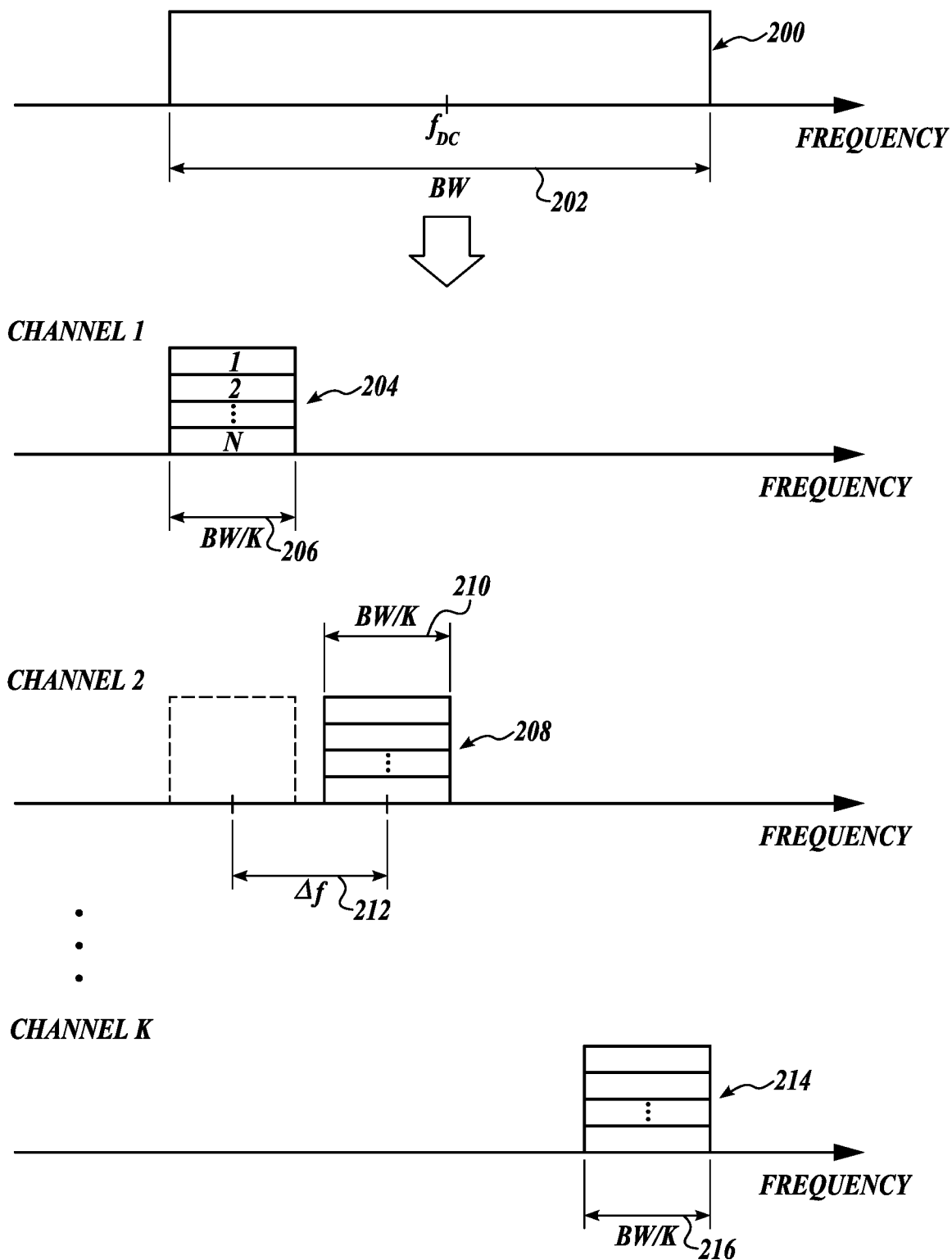
FIG. 2 is an example illustration of signals associated with the DBF chip in accordance with some embodiments of the present disclosure.

FIG. 2 is an example illustration of signals associated with DBF chip 100 in accordance with some embodiments of the present disclosure. In an embodiment, signal 200 represents a transmitted beam detected by the M antenna elements and after down conversion by the DBF chip 100. Signal 200 has a bandwidth 202 of BW. DBF chip 100 is configured to disaggregate signal 200 into discrete channels, and within each respective channel, the plurality of data beams included in the channel superimposed, "stacked" together, or located in the same frequency range, as shown in signals 204, 208, and 212. Signal 204 is representative of a first channel signal including a plurality of data beams (1:N data beams, in which N>2). Signal 204 has a bandwidth 206 of BW/K, where K equals the number of channels contained in signal 200 and is greater or equal to 2. The first channel may also be referred to as channel 1. Signal 208 is representative of a second channel signal including a plurality of data beams (N number of data beams in which N>2 such as N+1:2N data beams) and having a bandwidth 212 of BW/K. Signal 208 is frequency shifted relative to the other channels included in signal 200 so as not to overlap with the other channels. A frequency shift 212 of Δf is applied to the center frequency associated with signal 208, for example. The second channel may also be referred to as channel 2.

Each of the other channels included in signal 200 undergo similar extraction or disaggregation, with a particular different frequency shift applied to respective channels, to the last channel (e.g., channel K). Signal 214 is representative of the last or Kth channel signal including a plurality of data beams (N number of data beams in which N>2) and having a bandwidth 216 of BW/K. As with each of the channels extracted from signal 200, signal 214 has a center frequency after frequency shifting that is different from the frequency shifted center frequency of the other channels included in signal 200.

Accordingly, a total of K channels and KxN number of data beams contained in the K channels are reconstituted, extracted, reassembled, and/or the like by DBF chip 100 from the RF signals received by the M antenna elements. The resulting reconstituted K channels containing KxN data beams comprise the same data in the same format, arrangement, or configuration as was provided by a modem to a transmitter for transmission.

Figure 3:
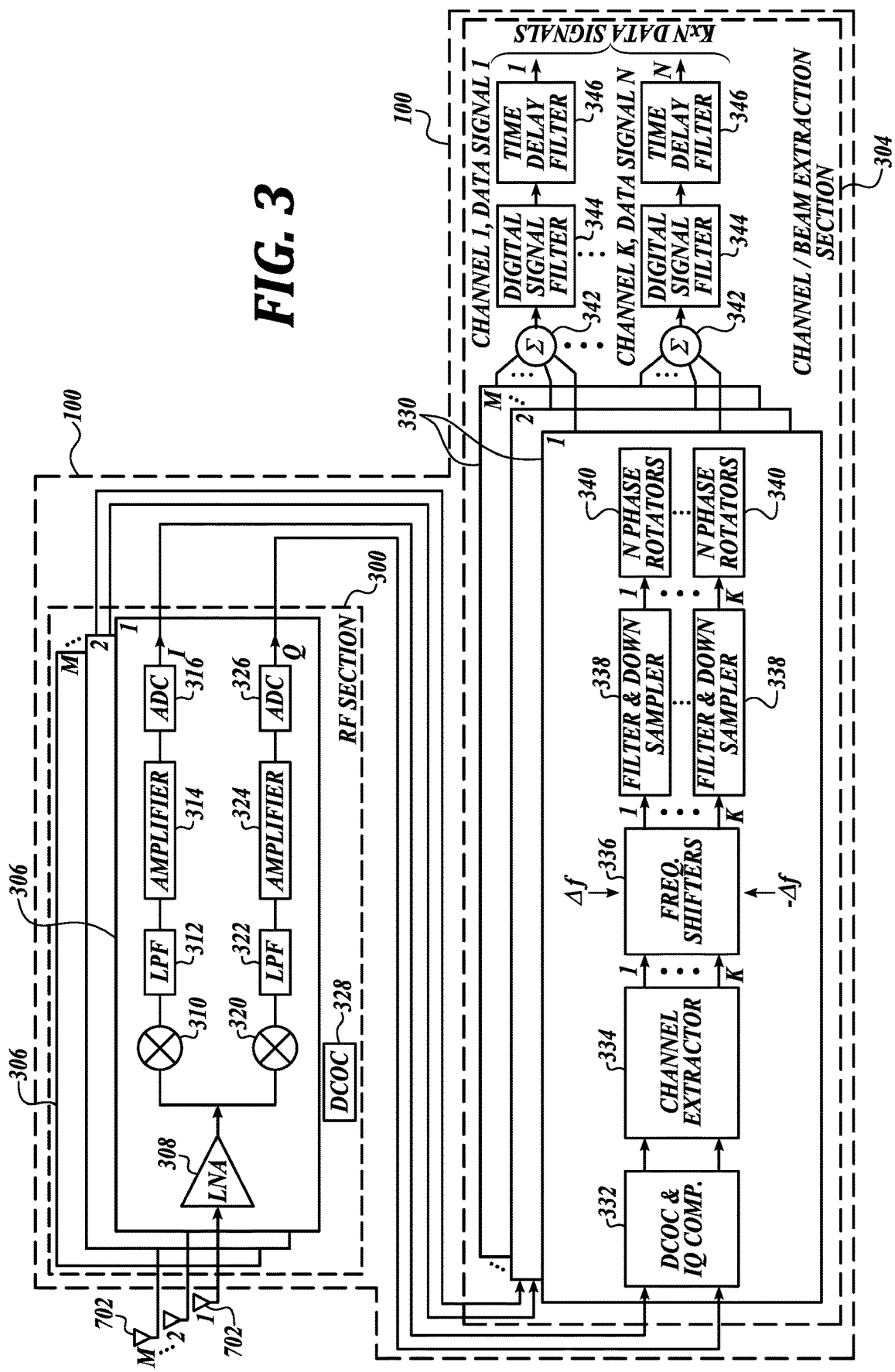
FIG. 3 is an example illustration showing circuitry or components included in the DBF chip in accordance with some embodiments of the present disclosure.

FIG. 3 is an example illustration showing circuitry or components included in the DBF chip 100 in accordance with some embodiments of the present disclosure. In an embodiment, DBF chip 100 includes a RF section 300 and a channel/beam extraction section 304.

RF section 300 comprises a direct current offset compensator (DCOC) and a plurality of quadrature direct conversion receivers 306. Each quadrature direct conversion receiver of the plurality of quadrature direct conversion receivers 306 includes a low noise amplifier (LNA) 308, a down converter 310, a low pass filter (LPF) 312, an amplifier 314, an analog-to-digital converter (ADC) 316, a down converter 320, a LPF 322, an amplifier 324, and an ADC 326. The input of the LNA 308 is electrically coupled with an output of a respective antenna element 702. The output of the LNA 308 is the input to each of the down converters 310 and 320. LPF 312 is electrically coupled between down converter 310 and amplifier 314. Amplifier 314 is electrically coupled between LPF 312 and ADC 316. LPF 322 is electrically coupled between down converter 320 and amplifier 324. Amplifier 324 is electrically coupled between LPF 322 and ADC 326.

RF section 300 includes an M number of quadrature direct conversion receivers 306, one receiver for each of the M antenna elements 702, where M≥2.

Channel/beam extraction section 304 (also referred to as a baseband section, a digital baseband section, and/or the like) comprises a plurality of subsections 330, a plurality of summation components or combiners 342, a plurality of digital beam filters 344, and a plurality of time delay filters 346. The two outputs of each of the quadrature direct conversion receivers 306 of RF section 300 comprise the inputs to a respective subsection 330. The outputs of subsections 330 are the inputs to the plurality of summation components 342. The plurality digital beam filters 344 are electrically coupled between the plurality of summation components 342 and the plurality of time delay filters 346. The outputs of the plurality of time delay filters 346 comprise KxN data beams. Each of the subsections 330 includes a DCOC and IQ compensator 332, a channel extractor 334, a plurality of frequency shifters 336, a plurality of filter and down samplers 338, and a plurality of phase rotator sets 340. The outputs of a quadrature direct conversion receiver 306 are the inputs to a respective DCOC and IQ compensator 332. The channel extractor 334 is electrically coupled between the DCOC and IQ compensator 332 and the plurality of frequency shifters 336. The plurality of frequency shifters 336 are electrically coupled between the channel extractor 344 and the plurality of filter and down samplers 338. The plurality of filter and down samplers 338 are electrically coupled between the plurality of frequency shifters 336 and the plurality of phase rotator sets 340.

A particular signal pathway or path associated with each of the 1:M antenna elements 702 is thus defined by a particular antenna element 702, receiver 306, and subsection 330. Such paths may be referred to as path 1, path 2, and so on to path M corresponding to respective antenna element 1, antenna element 2, and so on to antenna element M. The M signal paths may also be referred to as receive signal paths, receive signal processing paths, and/or the like.

The received RF analog signal at each of the M antenna elements 702 has a certain amplitude and phase, which can be expressed by I and Q components, respectively, of an IQ complex signal. The I and Q components of the IQ complex signals are processed in parallel in the respective receivers 306. Down converter 310, LPF 312, amplifier 314, and ADC 316 comprise an I or cosine branch of a quadrature direct conversion receiver 306. The I or cosine branch is associated with processing of the I component of the received RF signal. Down converter 320, LPF 322, amplifier 324, and ADC 326 comprise a Q or sine branch of a quadrature direct conversion receiver 306. The Q or sine branch is associated with processing of the Q component of the received RF signal.

LNA 308 is configured to perform low noise amplification of the analog RF signal received at the respective antenna element 702. The amplified RF signal is provided to each of the I and Q branches. For the I branch, down converter 310 is configured to perform frequency down conversion to change the center frequency associated with the amplified signal by uncoupling the amplified signal from the RF carrier frequency to the baseband frequency (e.g., change from $f_{RF}$ to $f_{DC}$). Signal 200 in FIG. 2 is an example of the amplified signal at the output of down converter 310. Next, the signal is low pass filtered or de-noised by LPF 312. The filtered signal is then amplified by amplifier 314. The amplified signal, which is an analog signal, undergoes conversion to a digital signal in ADC 316. The output of ADC 316, a digital I component of the received RF signal, is the first input to the DCOC and IQ compensator 332 included in respective subsection 330.

The Q component of the received RF signal undergoes similar processing as described above using down converter 320, LPF 322, amplifier 324, and ADC 326. The output of ADC 326, a digital Q component of the received RF signal, is the second input to the DCOC and IQ compensator 332 included in respective subsection 330.

Accordingly, the RF analog signal received by the ith antenna element 702 (where i=1 to M) is processed by the ith receiver 306, and the two outputs of the ith receiver 306 are inputted to the DCOC and IQ compensator 332 included in the ith subsection 330.

Each of the RF signals received by the M antenna elements 702 contains a portion of the KxN data beams. The channel/beam extraction section 304 is configured to reassemble or reconstitute the various portions of the KxN data beams and disambiguate between them so that discrete data beams of the plurality of channels can be read or recovered. In an embodiment, the channel/beam extraction section 304 is configured to separate the channels and/or data beams superimposed on each other in the RF signals received by the M antenna elements 702. The information contained in each of the data beams can thus be known at the receiver side. The KxN data beams are also referred to as data signals, data streams, data, and/or the like.

In some embodiments, each of RF sections 300 may include a receive digital front end (Rx DFE). One or more of the components included in a given RF section 300 may comprise a portion of the Rx DFE.

DCOC and IQ compensator 332 is configured to compensate for any undesirable offsets in the digital I and Q signals that may have occurred during signal processing in the RF section 300 (e.g., perform phase impairment, DC compensation, etc.), correct for propagation delays, and/or perform other compensations in readiness for channel extraction and decoding to be performed. The compensated I and Q signals outputted from the DCOC and IQ compensator 332 are the inputs to the channel extractor 334. Channel extractor 334, also referred to as a channel separator, is configured to extract or separate the channels of the plurality of channels included in the compensated I and Q signals. The outputs of the channel extractor 334 are 1:K channel signals, where K≥2.

The K channel signal outputs of the channel extractor 334 are the inputs to frequency shifters 336. Frequency shifters 336 may comprise K number of frequency shifters, one frequency shifter for each of the K channel signals. Frequency shifters 336 may also be referred to as digital mixers, digital frequency shifters, or the like. In an embodiment, each of the frequency shifters 336 is configured to frequency shift the center frequency associated with the respective channel signals by a particular amount. The amount of frequency shift applied to each of the channels is selected so that all the channels after frequency shifting are distributed at different frequencies from each other and do not overlap or stack on each other in the frequency domain. Signals 204, 208, and 214 in FIG. 2 shows the distribution of the channels as a function of frequency after frequency shifting has been performed.

Next, the K frequency shifted channel signals are provided to the filter and down samplers 338. Filter and down samplers 338 comprise K number of filter and down samplers, one for each of the K frequency shifted channel signals. Each of the filter and down samplers 338 is configured to remove noise and other undesirable components from its channel signal and down sample the filtered channel signal to a lower sample rate or density. The output of each of the filter and down samplers 338 is the input to a respective phase rotator set 340.

The plurality of phase rotator sets 340 comprises a K number of phase rotator sets. Each phase rotator set 340, in turn, includes N phase rotators, in which each of the 1:N phase rotators is configured to apply a particular phase shift. The phase shift associated with each of the KxN phase shifters can be different from each other. In an embodiment, the phase shift applied by each of the KxN phase shifters is calculated based on geometry of the phased array antenna and the direction of the incoming signal into the phased array antenna. The phase decoding along with the time delay decoding, to be discussed in connection with time delay filters 346, permits full recovery of the original data beams. Phase rotators included in the phase rotator sets 340 may also be referred to as phase shifters, phase multipliers, and/or the like.

Figure 4:
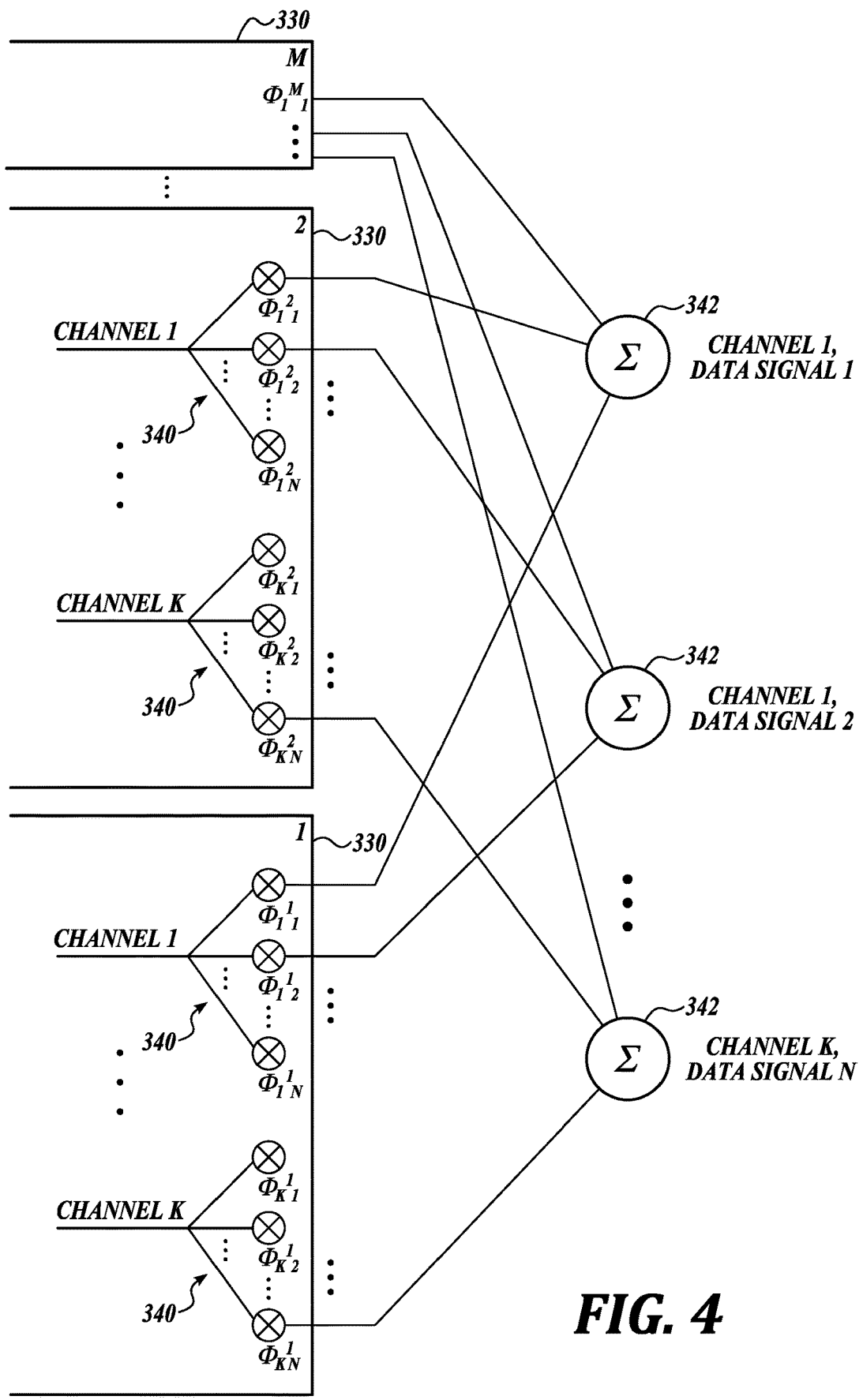
FIG. 4 is an example illustration showing additional details relating to the phase rotator sets and summation components of the DBF chip in accordance with some embodiments of the present disclosure.

The KxN outputs of the plurality of phase rotator sets 340 are the inputs to the plurality of summation components or combiners 342. The plurality of summation components 342 comprises KxN number of summation components, a summation component for each data beam in the K channels. The summation components 342 may also be referred to as combiners, adders, or the like. FIG. 4 is an example illustration showing additional details relating to the phase rotator sets 340 and summation components 342 in accordance with some embodiments of the present disclosure.

As shown, each of the 1:M subsections 330 includes 1:K phase rotator sets 340. A phase $\Phi_{jk}^{i}$ is associated with the respective plurality of phase rotator sets 340, where i=1 to M number of antenna elements, j=1 to K number of channels, and k=1 to N number of data beams per channel. The summation component 342 associated with channel 1, data beam 1 (j=1, k=1) sums the outputs of phase rotator $\Phi_{11}^{1}$ included in subsection 330 for antenna element/path 1 (i=1), phase rotator $\Phi_{11}^{2}$ included in subsection 330 for antenna element/path 2 (i=2), and so on to phase rotator $\Phi_{11}^{M}$ included in subsection 330 for antenna element/path M (i=M). The summation component 342 associated with channel 1, data beam 2 (j=1, k=2) sums the outputs of phase rotator $\Phi_{12}^1$ included in subsection 330 for antenna element/path 1 (i=1), phase rotator $\Phi_{12}^2$ included in subsection 330 for antenna element/path 2 (i=2), and so on to phase rotator $\Phi_{12}^M$ included in subsection 330 for antenna element/path M (i=M). The remaining summation components 342 perform similar summation of respective phase rotator outputs such that the last summation component 342 associated with channel K, data beam N (j=K, k=N) sums the outputs of phase rotator $\Phi_{KN}^1$ included in subsection 330 for antenna element/path 1(i=1), phase rotator $\Phi_{KN}^2$ included in subsection 330 for antenna element/path 2 (i=2), and so on to phase rotator $\Phi_{KN}^M$ included in subsection 330 for antenna element/path M (i=M).

Each of the time delay filters and phase rotators can be set and reset to particular time delays and phases, respectively. The phase rotators 340, summation components 342, digital beam filters 344, and time delay filter 346 collectively comprise a plurality of digital beamformers.

Figure 5A:
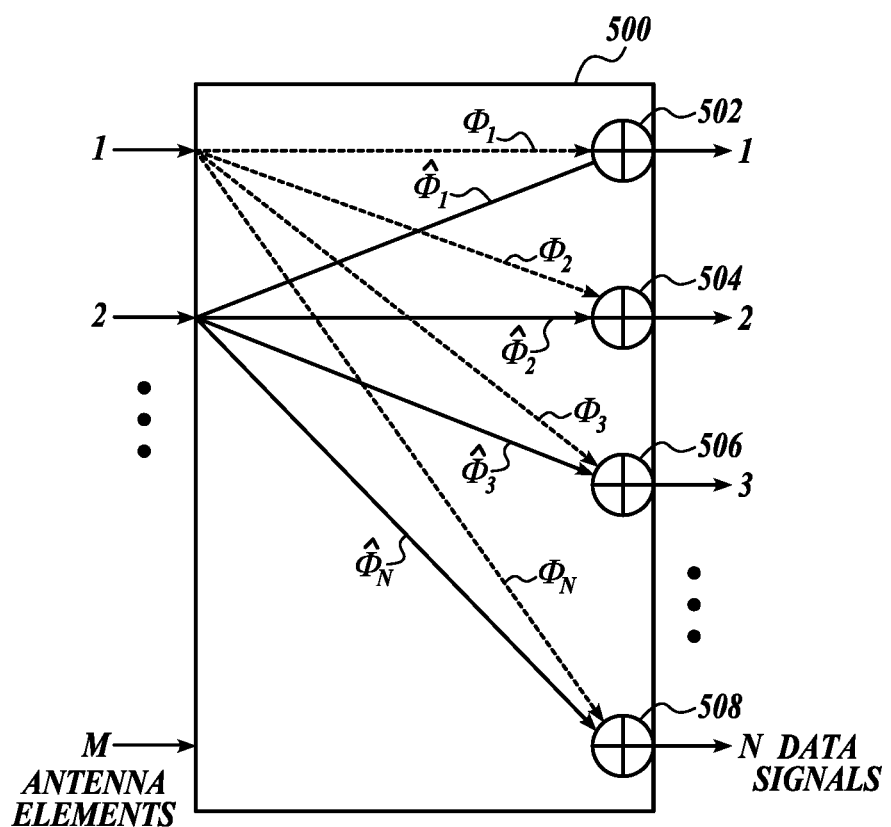
FIG. 5A is an example high level illustration showing the summation described above to obtain data beams from the RF signals received by antenna elements in accordance with some embodiments of the present disclosure.

FIG. 5A is an example high level illustration showing the summation described above to obtain data beams from the RF signals received by antenna elements in accordance with some embodiments of the present disclosure. Conceptual device 500 shows the signal pathways between the RF signal received by each of the antenna elements to summation components 502, 504, 506, 508. For each RF signal received by the 1:M antenna elements, the received RF signal contains portions of each of the 1:N data beams of a channel. Hence, each RF signal received by each antenna element is an input to each of the summation components 502, 504, 506, 508. For example, a first portion of the RF signal of antenna element 1 (denoted as $\Phi_1$) is an input to summation component 502 associated with data beam 1, a second portion of the RF signal of antenna element 1 (denoted as $\Phi_2$) is an input to summation component 504 associated with data beam 2, a third portion of the RF signal of antenna element 1 (denoted as $\Phi_3$) is an input to summation component 506 associated with data beam 3, and so on to a last portion of the RF signal of antenna element 1 (denoted as $\Phi_N$) is an input to summation component 508 associated with data beam N. The RF signal of antenna element 2 is similarly an input to each of the summation components 502, 504, 506, 508.

Returning to FIG. 3, the plurality of digital beam filters 344 comprises KxN number of digital beam filters, one for each of the respective summation components 342. The output of summation component 342 associated with channel j, data beam k is the input to digital beam filter 344 associated with channel j, data beam k. For example, the output of summation component 342 associated with channel 1, data beam 1 is the input to digital beam filter 344 associated with channel 1, data beam 1. Digital beam filters 344 are configured to filter the respective digital phase decoded signals (e.g., to remove noise) and provide to respective time delay filters 346.

The plurality of time delay filters 346 comprises KxN number of digital beam filters, one for each of the respective digital beam filters 344. The output of digital beam filter 344 associated with channel j, data beam k is the input to time delay filter 346 associated with channel j, data beam k. For example, the output of digital beam filter 344 associated with channel 1, data beam 1 is the input to time delay filter 346 associated with channel 1, data beam 1. Time delay filters 346 are configured to apply a particular time delay to the respective digital filtered, phase decoded signals. The amount of time delay applied by each of the time delay filters 346 differs from each other. Similar to the decoding performed by the phase rotators 340, the time delay filters 346 are configured to decode or undo the time delays encoded into the data beams by the transmitter to facilitate wireless transmission. With the data beams received at the receiver side, such data beams are being returned to their original state.

Each of the 1:KxN time delay filters 346 outputs a respective 1:KxN data beam. Accordingly, the output of the time delay filters 346, and by extension, the DBF chip 100, is KxN data beams.

Figure 5B:
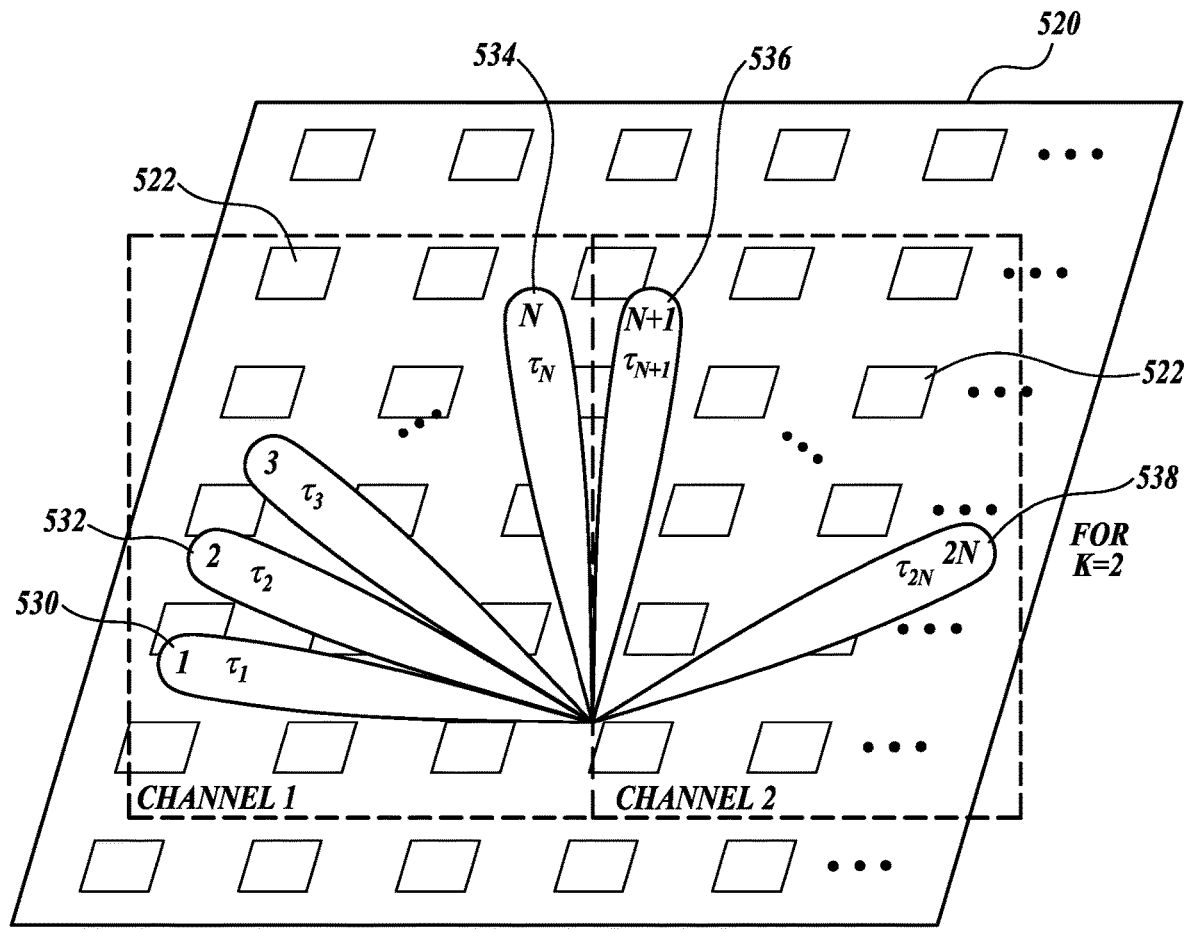
FIG. 5B is an example illustration showing an overall radiation or signal transmitted by a plurality of antenna elements included in an antenna lattice of a transmitter system in accordance with some embodiments of the present disclosure.

FIG. 5B is an example illustration showing an overall radiation or signal (also referred to as a transmission beam or beam) transmitted by a plurality of antenna elements 522 included in an antenna lattice 520 of a transmitter system in accordance with some embodiments of the present disclosure. In particular, the main lobes of the overall radiation or signal are shown with side lobes and possible other minor components omitted to simplify illustration. The overall radiation or signal is received by the M antenna elements 702 and undergoes processing by DBF chip 100 to obtain the data beams contained in the overall radiation or signal. The overall radiation or signal comprises two channels (K=2), as an example, with 1:N data beams included in a channel 1 and N+1:2N data beams included in a channel 2. As shown, each of the 2N data beams was encoded with a different time delay. For instance, time delay $\tau_1$ for data beam 530, time delay $\tau_2$ for data beam 532, time delay $\tau_N$ for data beam 534, time delay $\tau_{N+1}$ for data beam 536, time delay $\tau_{2N}$ for data beam 538, and the like. Time delay filters 346 are configured to decode such time delays ($\tau_1$, $\tau_2$, $\tau_3$, etc.) to recover the original data beams.

In some embodiments, DBF chip 100 may include one or more additional components, circuitry, and/or the like. An interface may be included between the RF section 300 and each of the DCOC and IQ compensators 332 to facilitate transition of signals between the RF and channel/beam extraction sections 300, 304.

Figure 6:
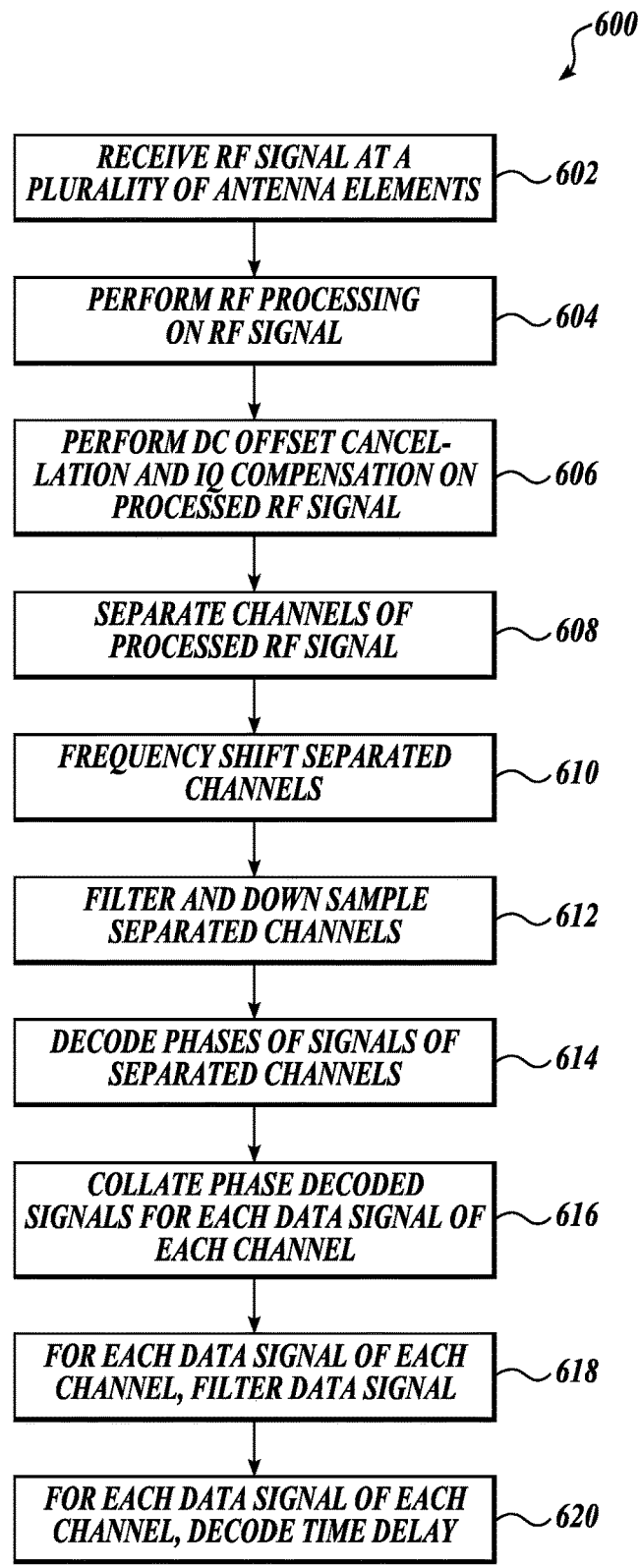
FIG. 6 is an example illustration of a process performed by the DBF chip in accordance with some embodiments of the present disclosure.

FIG. 6 is an example illustration of a process 600 performed by DBF chip 100 in accordance with some embodiments of the present disclosure. At a block 602, the DBF chip 100 receives RF signals from the M antenna elements 702. In response, the RF section 300 of DBF chip 100 performs RF processing on the received RF signals at a block 604. The RF signal from each antenna element 702 is RF processed by a respective receiver 306 to, among other things, down convert the received signal from the carrier frequency and convert the analog signal into a digital signal. The output of each receiver 306 comprises an I component and a Q component of a complex IQ signal, collectively refers to as a processed signal or a processed RF signal.

The processed signals from the plurality of receivers 306 are provided to respective subsections 330 included in the channel/beam extraction section 304. The DCOC and IQ compensator 332 included in each subsection 330 is configured to perform DC offset cancellation and IQ compensation of the received I and Q components, at a block 606. Next at a block 608, separation or extraction of channels included in the compensated I and Q components is performed by each of the channel extractors 334. Each of the M channel extractors 334 outputs K channel signals identified and separated from each other based on the inputted I and Q components of the processed signal.

With the channels separated from each other, in each of the M subsections 330, each of the separated channels undergoes respective frequency shifting by the K frequency shifters 336, at a block 610. The central frequencies associated with the separated channels are shifted by a particular amount from each other so that the channels they do not overlap or stack onto each other in the frequency domain.

Next at block 612, in each of the M subsections 330, each of the frequency shifted channels is filtered and down sampled by a respective K filter and down samplers 338. In some embodiments, the amount of down sampling is equal in magnitude to the amount of up sampling of the data beams in the transmitter that transmitted the data beams to the M antenna elements 702.

In each of the M subsections 330, the K phase rotators 340 are configured to apply particular phase shifts to the K filtered and down sampled signals from the filter and down samplers 338, at a block 614. The different phases induced in the RF signals for transmission to the M antenna elements 702 are removed or decoded for each of the data beams included in the received RF signals, so as to recover the underlying or original data beams of the channels.

The data beams with decoded phases are collated or grouped together per data beam per channel at a block 616. The summation components 342 are configured to perform the collation function. The output of each of the summation components 342 comprises a particular phase decoded data beam of a channel, for a total of KxN phase decoded data beams of the K channels.

Each of the phase decoded data beam is filtered by a respective digital beam filter 344, at a block 618. Each of the filtered data beam is time delay decoded by a respective time delay filter 346, at a block 620. The different time delays induced in the RF signals for transmission to the M antenna elements 702 are removed or decoded for each of the data beams included in the received RF signals. Along with the signal processing performed in the preceding blocks including, but not limited to, the phase decoding at block 614, time delay decoding perform at block 620 completes recovery of the underlying or original data beams of the channels. The outputs of the KxN time delay filters 346 are KxN data beams of the K channels.

As an example, without limitation, the outputs of DBF chip 100 can be 64 data beams, comprising 8 data beams (N=8) per channel and 8 channels (K=8) total received by 32 (M=32) antenna elements 702. With one data beam allocated per user, a total of 64 users can be supported by the 32 antenna elements 702 and a single DBF chip 100.

The antenna lattice 700 of FIG. 7, or more particularly, subset 704 of antenna elements 702 is configured to receive a combined transmission beam composed of M RF signals having a preferred beam direction. An antenna aperture (also referred to as an aperture) is associated with antenna lattice 700. The antenna aperture is the area through which power is received by or to the antenna elements 702.

A phased array antenna synthesizes a specified electric field (phase and amplitude) across an aperture. Adding a phase shift to the signal received or transmitted by each antenna in an array of antennas allows the collective signal of these individual antennas to act as the signal of a single antenna.

In designing an antenna aperture for generating a single beam from a plurality of antenna elements, there are multiple considerations for efficiency in the system, including, but not limited to, total gain desired, beamwidth (e.g., how pointed the beam will be, a fan beam or a pencil beam, for example), and undesirable effects, such as side lobes.

Gain at broadside in a phased array is both a function of the individual element gain and the number of elements. The antenna aperture gain can be calculated by the following equation:

$$G_A = 4\pi(A\eta/\lambda^2)$$

where A=aperture area; η=aperture efficiency; and λ=wavelength.

The number of elements required in an electronically-scanning phased array antenna can be estimated by the gain it must provide. Generally, more antenna elements yields more gain in a phased array antenna. For example, a 30 decibel (dB) gain array may include about 1000 antenna elements and a 20 dB gain array may include about 100 antenna elements. Uniform spacing between antenna elements (e.g., spacing or distance 910) is typically more advantageous in terms of total gain than non-uniform spacing between antenna elements. However, gain is reduced when scanning at an angle proportional to the cosine of the angle. Therefore, when scanning at 60 degrees, the gain is reduced to ½.

The total area of the antenna aperture affects beamwidth. Therefore, the larger the area of the antenna aperture, the narrower the beam produced from the antenna aperture.

In an antenna aperture having an antenna lattice with a plurality of antenna elements, gaps between adjacent antenna elements can produce unwanted side lobes. Therefore, a threshold maximum spacing can be calculated between antenna elements to reduce unwanted side lobes. The individual antenna elements are spaced in the antenna aperture below the threshold maximum spacing to reduce side lobe leakage.

In addition to unwanted side lobes, grating lobes can occur when steering too far with a phased array. The effect of grating lobes is also referred to as "aliasing," resulting in the main beam reappearing on the wrong side. Therefore, antenna elements must also be spaced properly in order to avoid grating lobes. For uniformly spaced arrays with a constant spacing between elements, the maximum spacing can be half-wavelength to avoid grating lobes.

The equation for maximum spacing is a function of wavelength of operation and maximum scan angle:

$$d_{max} = \lambda/(1+\sin\theta)$$

where λ=wavelength and θ=scan angle.

Thus for a 30 degree scan angle, $d_{max}$ is (⅔)λ, while for a 60 degree scan angle, $d_{max}$ is 0.54 λ.

Therefore, the desired antenna aperture requires a balancing of multiple trade-offs in the system. For example, the system has a power budget for a total number of antenna elements. Knowing the total number of antenna elements based on the power budget, the area of the antenna aperture should be maximized for optimal beamwidth, but the spacing between antenna elements should be minimized to reduce side lobes, grating lobes, and aliasing.

The phased array antenna system including DBF chip 100 includes in total, a plurality of DBF chips similar to DBF chip 100. Each DBF chip of the plurality of DBF chips is configured to receive RF signals from a different subset of the plurality of antenna elements 702 included in the antenna lattice 700. For example, DBF chip 100 is associated with subset 704, another DBF chip is associated with a subset 706 of the plurality of antenna elements 702 different from subset 904, and the like. The phased array antenna system can include a minimum number of DBF chips that is the total number of antenna elements divided by M.

In some embodiments, the phased array antenna system including DBF chip 100 and the rest of the plurality of DBF chips are included in a wireless communications system, a wideband communications system, a satellite-based communications system, a terrestrial-or ground-based communications system, a non-geostationary (NGO) satellite communications system, a low Earth orbit (LEO) satellite communications system, and/or the like. For example, without limitation, the phased array antenna system can be included in a satellite, a user terminal associated with user device(s), a gateway, a repeater, a communication node, and/or other device capable of receiving and transmitting signals with another device of a satellite communications system.

Figure 8:
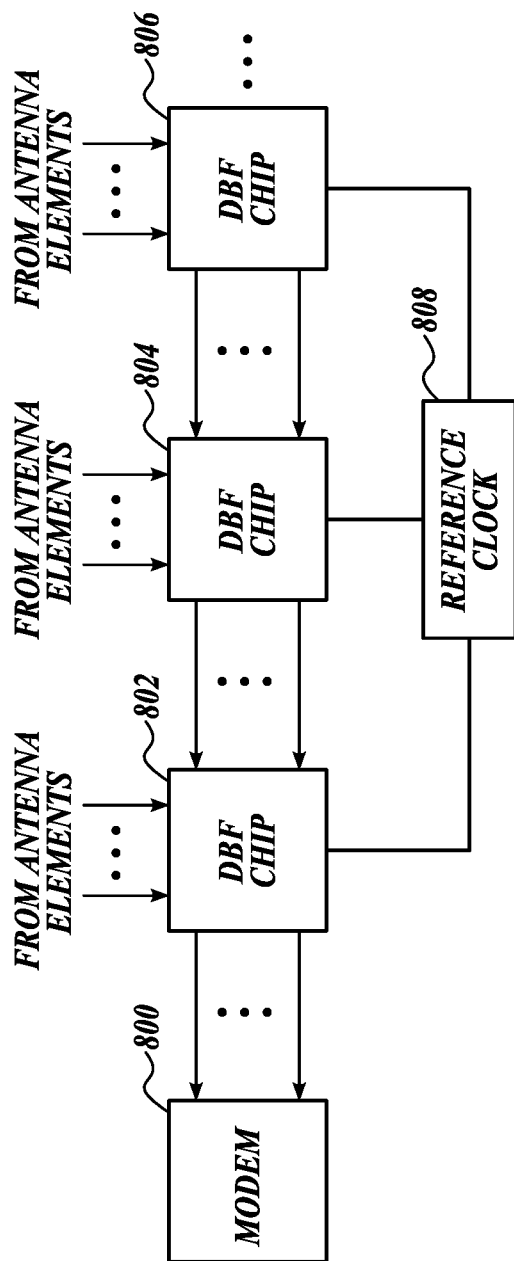
FIG. 8 is an example illustration of DBF chips implemented in a daisy chain configuration in accordance with some embodiments of the present disclosure.

FIG. 8 is an example illustration of DBF chips implemented in a daisy chain configuration in accordance with some embodiments of the present disclosure. A different set of antenna elements is associated with each of DBF chips 802, 804, and 806. Each of the antenna element sets is configured to receive RF signals and provide the received RF signals to its respective DBF chip 802, 804, or 806. In response, DBF chips 802, 804, 806 perform signal processing as discussed above to generate respective data beams. At least a portion of the data beams generated by DBF chip 806 is provided to a modem 800 via DBF chips 802, 804. At least a portion of the data beams generated by DBF chip 804 is provided to modem 800 via DBF chip 802. At least a portion of the data beams generated by DBF chip 802 is provided to modem 800. DBF chips 802, 804, 806 are synchronized by a common reference clock 808.

In this manner, each antenna element of a plurality of antenna elements included in a phased array antenna receives a RF signal composed of at least a portion of a plurality of channels and a plurality of data beams within each of such plurality of channels. A DBF chip receives the RF signals from the plurality of antenna elements and processes the received RF signals to reconstruct the plurality of data beams contained in each of the plurality of channels. Associated with each of the receiving plurality of antenna elements, the DBF chip performs, among other things, channel separation to extract the different channels within the received signal and decode the phases included in the received signal. The DBF chip collates select portions of the phase decoded received signals of all the antenna elements associated with the DBF chip to generate a plurality of phase decoded data beams. Each of the phase decoded data beams is time delay decoded, resulting in recovery of the plurality of data beams of the plurality of channels sent from a transmitter.

Because channel extraction is performed in each of the M paths within the DBF chip, a single receiver 306 can be implemented per antenna element path. Accordingly, a fewer number of components (e.g., RF section 300 components) are needed within the DBF chip.

In some embodiments, one or more of particular signal paths of the channel/beam extraction section 304 can be effectively made inactive or disabled by dynamic control of the gain associated with such one or more the particular signal paths. A processor or controller is configured to determine when and which of the particular signal paths are to be effectively inactive or disabled. In response to the determination, the gain factor or value associated with each of those particular signal paths of interest is set to zero (changed from a value greater than zero to zero). Accordingly, all of the signal paths continue to process the received signals as described above, but the signal components processed by the zero-gain signal paths will have zero amplitude and contribute a null or no data carrying component in the reconstituted signal. The remaining components of the reconstituted signal (those from the non-zero gain signal paths) and the overall reconstituted signal are not adversely impacted by the components associated with the zero gain.

Dynamic selective gain setting of particular signal paths of the channel/beam extraction section 304 of DBF chip 100 can occur in accordance with inactive or null data beams in the KxN data beams, particular of antenna elements 702 to be inactive (e.g., antenna elements along the perimeter of the antenna lattice), and/or for other reasons. This means that DBF chip 100 can independently select to not pass certain data beams (or portions of certain data beams) to the modem even if all KxN data beams are received from the antenna elements 702, DBF chip 100 can proactively effectively disable particular signal paths associated with data beams known to be inactive or null data (e.g., so as to save power), and/or the like.

Examples of the devices, systems, and/or methods of various embodiments are provided below. An embodiment of the devices, systems, and/or methods can include any one or more, and any combination of, the examples described below.

Example 1 is an apparatus including a radio frequency (RF) receiver section configured to receive a RF signal from an antenna of a phased array antenna, the RF signal comprising at least a portion of a plurality of data beams included in a single channel, wherein the RF receiver section includes an analog-to-digital converter (ADC) and a mixer; a first channel separator electrically coupled with the RF receiver section and configured to generate a plurality of channel signals based on the RF signal, wherein the plurality of channel signals comprises separation of the RF signal into a plurality of channels in which each channel of the plurality of channels includes at least a portion of a respective subset of the plurality of data beams; a plurality of phase shifters electrically coupled to the first channel separator and configured to decode each data beam of the plurality of channel signals with a respective phase; and a plurality of time delay filters electrically coupled to the plurality of phase shifters and configured to decode each data beam of the plurality of channel signals with a respective time delay, wherein the plurality of time delay filters outputs the plurality of data beams of the plurality of channels.

Example 2 includes the subject matter of Example 1, and further includes wherein the plurality of phase shifters includes first and second plurality of phase shifters, wherein the first plurality of phase shifters is associated with a first channel of the plurality of channels and electrically coupled with the first channel separator, the first plurality of phase shifters configured to decode each data beam portion of a first channel with a respective phase to generate a first plurality of decoded phase data beam portions, wherein the second plurality of phase shifters is associated with the first channel of the plurality of channels and electrically coupled with a second channel separator associated with another RF receiver section different from the RF receiver section, the second plurality of phase shifters configured to decode each data beam portion of the first channel of the plurality of channel signals with a respective phase to generate a second plurality of decoded phase data beam portions.

Example 3 includes the subject matter of any of Examples 1-2, and further includes a combiner electrically coupled with select phase shifters of the first and second plurality of phase shifters, the combiner configured to collate a first decoded phase data beam portion of the first plurality of decoded phase data beam portions, associated with a first data beam of the first channel, and a second decoded phase data beam portion of the second plurality of decoded phase data beam portions, associated with the first data beam of the first channel, to generate a signal of the first data beam of the first channel.

Example 4 includes the subject matter of any of Examples 1-3, and further includes wherein a time delay filter of the plurality of time delay filters is electrically coupled with the combiner and configured to decode a time delay included in the signal of the first data beam of the first channel to obtain the first data beam of the first channel.

Example 5 includes the subject matter of any of Examples 1-4, and further includes wherein the apparatus comprises an integrated circuit (IC) chip.

Example 6 includes the subject matter of any of Examples 1-5, and further includes a plurality of RF receiver sections and a plurality of channel separators, wherein the RF receiver section is included in the plurality of RF receiver sections and the first channel separator is included in the plurality of channel separators.

Example 7 includes the subject matter of any of Examples 1-6, and further includes wherein a number of RF receiver sections of the plurality of RF receiver sections equals a number of channel separators of the plurality of channel separators.

Example 8 includes the subject matter of any of Examples 1-7, and further includes wherein a number of antennas of the phased array antenna associated with the apparatus equals a number of the RF receiver sections of the plurality of RF receiver sections.

Example 9 includes the subject matter of any of Examples 1-8, and further includes wherein the number of antennas associated with the apparatus equals M, the number of channels of the plurality of channels equals K, the number of data beams per channel equals N, and wherein a number of phase shifters of the plurality of phase shifters equals KxNxM.

Example 10 includes the subject matter of any of Examples 1-9, and further includes wherein a number of time delay filters of the plurality of time delay filters is equal to a total number of data beams in the plurality of channels.

Example 11 is a receiver included in a communications system, the receiver including a channel extractor configured to segregate a received signal into a plurality of channel signals, wherein the plurality of channel signals includes a plurality of data signals, wherein the received signal comprises a single channel including the plurality of data signals, and wherein the received signal is to be configured for transmission as the single channel based on the plurality of data signals included in a plurality of channels, each channel of the plurality of channels including more than one data signal of the plurality of data signals; a plurality of phase shifters electrically coupled to the channel extractor and configured to decode each data signal of the plurality of data signals with a respective phase; and a plurality of time delay filters electrically coupled to the plurality of phase shifters and configured to decode each data signal of the plurality of data signals with a respective time delay, wherein the plurality of time delay filters outputs each subset of the plurality of data signals in a respective channel of the plurality of channels.

Example 12 includes the subject matter of Example 11, and further includes a radio frequency (RF) receiver section electrically coupled to the channel extractor, wherein the RF receiver section includes an analog-to-digital converter (ADC) and a down converter, and wherein the RF receiver section is configured to receive a RF signal from an antenna element of a phased array antenna and generate the received signal based on the RF signal.

Example 13 includes the subject matter of any of Examples 11-12, and further includes wherein the output of the plurality of time delay filters is the same as the plurality of data signals included in the plurality of channels from which the single channel is to be generated for transmission, and wherein each data signal of a subset of the plurality of data signals included in a channel is provided on a same frequency range of the channel.

Example 14 includes the subject matter of any of Examples 11-13, and further includes wherein a bandwidth of the single channel is equal to a bandwidth of a channel of the plurality of channels.

Example 15 includes the subject matter of any of Examples 11-14, and further includes wherein a bandwidth of the single channel is equal to a sum of bandwidths of the plurality of channels.

Example 16 includes the subject matter of any of Examples 11-15, and further includes wherein the communications system comprises a satellite communications system, and wherein the receiver is included in any of a satellite, a user terminal associated with a user device, a gateway, a repeater, or a communication node of the satellite communications system.

Example 17 includes the subject matter of any of Examples 11-16, and further includes a plurality of signal paths defined by electrical components configured to process the received signal and generate the plurality of data signals in the plurality of channels, wherein the electrical components include the channel extractor, the plurality of phase shifters, and the plurality of time delay filters, and wherein one or more of particular signal paths of the plurality of signal paths is dynamically set to zero gain.

Example 18 includes the subject matter of any of Examples 11-17, and further includes a radio frequency (RF) receiver section electrically coupled to the channel extractor, wherein the RF receiver section includes an analog-to-digital converter (ADC) and a down converter, wherein the plurality of phase shifters includes first and second plurality of phase shifters, wherein the channel extractor comprises a first channel separator, wherein the first plurality of phase shifters is associated with a first channel of the plurality of channels and electrically coupled with the first channel separator, wherein the first plurality of phase shifters is configured to decode each data signal portion of a first channel of the plurality of channel signals with a respective phase to generate a first plurality of decoded phase data signal portions, and the second plurality of phase shifters is associated with the first channel of the plurality of channels and electrically coupled with a second channel separator associated with another RF receiver section different from the RF receiver section, the second plurality of phase shifters configured to decode each data signal portion of the first channel of the plurality of channel signals with a respective phase to generate a second plurality of decoded phase data signal portions.

Example 19 includes the subject matter of any of Examples 11-18, and further includes a combiner electrically coupled with select phase shifters of the first and second plurality of phase shifters, the combiner configured to collate a first decoded phase data signal portion of the first plurality of decoded phase data signal portions, associated with a first data signal of the first channel, and a second decoded phase data signal portion of the second plurality of decoded phase data signal portions, associated with the first data signal of the first channel, to generate a signal comprising the first data signal of the first channel.

Example 20 includes the subject matter of any of Examples 11-19, and further includes wherein a time delay filter of the plurality of time delay filters is electrically coupled with the combiner and configured to decode a time delay included in the signal comprising the first data beam of the first channel to obtain the first data signal of the first channel.

Example 21 includes the subject matter of any of Examples 11-20, and further includes a plurality of RF receiver sections and a plurality of channel extractors, wherein the channel extractor is included in the plurality of channel extractors, and wherein a number of RF receiver sections of the plurality of RF receiver sections equals a number of channel extractors of the plurality of channel extractors.

Example 22 includes the subject matter of any of Examples 11-21, and further includes wherein the received signal is received by a first antenna of a phased array antenna, wherein a subset of plurality of antennas included in the phased array antenna electrically couple to the plurality of RF receiver sections, wherein the first antenna is included in the subset of plurality of antennas, and wherein the number of antennas in the subset of plurality of antennas equals a number of the RF receiver sections of the plurality of RF receiver sections.

Example 23 includes the subject matter of any of Examples 11-22, and further includes wherein the number of antennas associated with the plurality of RF receiver sections equals M, the number of channels of the plurality of channels equals K, the number of data signals per channel equals N, and wherein a number of phase shifters of the plurality of phase shifters equals KxNxM.

Example 24 includes the subject matter of any of Examples 11-23, and further includes wherein the plurality of RF receiver sections, the plurality of channel extractors, the plurality of phase shifters, and the plurality of time delay filters are included in a first integrated circuit (IC) chip, further comprising a second plurality of RF receiver sections, a second plurality of channel extractors, a second plurality of phase shifters, and a second plurality of time delay filters included in a second IC chip different from the first IC chips, and further comprising a second subset of antennas, different from the subset of antennas, of the plurality of antennas of the phased array antenna, electrically coupled to the second IC chip.

Example 25 includes the subject matter of any of Examples 11-24, and further includes wherein a number of time delay filters of the plurality of time delay filters is equal to a total number of data signals in the plurality of channels.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

What we claim is:

1. An apparatus comprising:
   a radio frequency (RF) receiver section configured to receive a RF signal from a phased array antenna, the RF signal comprising at least a portion of a plurality of data beams included in a single channel;
   a plurality of channel separators electrically coupled with the RF receiver section and configured to generate a plurality of channel signals based on the RF signal, wherein generating the plurality of channel signals comprises separating the RF signal into a plurality of channels in which each channel of the plurality of channels includes at least a portion of a respective subset of the plurality of data beams; and
   a plurality of signal conditioning components electrically coupled to the plurality of channel separators and configured to decode each data beam of the plurality of channel signals with a respective phase and a respective time delay, wherein the plurality of signal conditioning components outputs the plurality of data beams of the plurality of channels.

2. The apparatus of claim 1, wherein the plurality of signal conditioning components includes a first plurality of phase shifters and a second plurality of phase shifters, wherein the first plurality of phase shifters is associated with a first channel of the plurality of channels and, the first plurality of phase shifters configured to decode each data beam portion of a first channel with a respective phase to generate a first plurality of decoded phase data beam portions, wherein the second plurality of phase shifters is associated with the first channel of the plurality of channels and electrically coupled with a second channel separator of the plurality of channel separators, the second plurality of phase shifters configured to decode each data beam portion of the first channel of the plurality of channel signals with a respective phase to generate a second plurality of decoded phase data beam portions.

3. The apparatus of claim 2, further comprising a combiner electrically coupled with select phase shifters of the first plurality of phase shifters and the second plurality of phase shifters, the combiner configured to collate a first decoded phase data beam portion of the first plurality of decoded phase data beam portions, associated with a first data beam of the first channel, and a second decoded phase data beam portion of the second plurality of decoded phase data beam portions, associated with the first data beam of the first channel, to generate a signal of the first data beam of the first channel.

4. The apparatus of claim 3, wherein a time delay filter of a plurality of time delay filters is electrically coupled with the combiner and configured to decode a time delay included in the signal of the first data beam of the first channel to obtain the first data beam of the first channel.

5. The apparatus of claim 1, further comprising a down converter included in a first beam extraction section of the RF receiver section and a first channel separator of the plurality of channel separators, wherein the down converter is configured to down convert the RF signal to a baseband frequency prior to separation of the RF signal into the plurality of channels.

6. The apparatus of claim 5, wherein:
   a first channel signal of the plurality of channel signals has a first central frequency and a second channel signal of the plurality of channel signals has a second central frequency;
   a first digital mixer is electrically coupled to the first channel separator and configured to shift the first central frequency by $\Delta f$; and
   a second digital mixer is electrically coupled to the first channel separator and configured to shift the second central frequency by $-\Delta f$.

7. The apparatus of claim 1, wherein a bandwidth of the single channel is equal to a sum of bandwidths of the plurality of channels.

8. A receiver included in a communications system, the receiver comprising:
- a channel extractor configured to segregate a received signal comprising a single channel including a plurality of data signals into a plurality of channel signals, wherein the plurality of channel signals includes a plurality of data signals, wherein one or more channels of the plurality of channels includes more than one data signal of the plurality of data signals;
- a plurality of decoders electrically coupled to the channel extractor and configured to decode each of the plurality of channel signals into a respective plurality of decoded data beam portions; and
- a plurality of RF receiver sections and a plurality of channel extractors, wherein the channel extractor is included in the plurality of channel extractors, and wherein a number of RF receiver sections of the plurality of RF receiver sections equals a number of channel extractors of the plurality of channel extractors.

9. The receiver of claim 8, further comprising a radio frequency (RF) receiver section electrically coupled to the channel extractor, wherein the RF receiver section includes an analog-to-digital converter (ADC) and a down converter, and wherein the RF receiver section is configured to receive a RF signal from an antenna element of a phased array antenna and generate the received signal based on the RF signal.

10. The receiver of claim 9, wherein a first data signal of the plurality of data signals arrives at the phased array antenna from a first direction, and a second data signal of the plurality of data signals arrives at the phased array antenna from a second direction, different from the first direction.

11. The receiver of claim 8, wherein a bandwidth of the single channel is equal to a bandwidth of a channel of the plurality of channels.

12. The receiver of claim 8, wherein a bandwidth of the single channel is equal to a sum of bandwidths of the plurality of channels.

13. The receiver of claim 8, wherein the communications system comprises a satellite communications system, and wherein the receiver is included in any of a satellite, a user terminal associated with a user device, a gateway, a repeater, or a communication node of the satellite communications system.

14. The receiver of claim 8, further comprising a plurality of signal paths defined by electrical components configured to process the received signal and generate the plurality of data signals in the plurality of channels, wherein the electrical components include the channel extractor, the plurality of decoders, and wherein one or more of particular signal paths of the plurality of signal paths is dynamically set to zero gain.

15. A receiver included in a communications system, the receiver comprising:
- a channel extractor configured to segregate a received signal comprising a single channel including a plurality of data signals into a plurality of channel signals, wherein the plurality of channel signals includes a plurality of data signals, each channel of the plurality of channels including more than one data signal of the plurality of data signals;
- a plurality of decoders electrically coupled to the channel extractor and configured to decode each of the plurality of channel signals into a respective plurality of decoded data beam portions; and
- a radio frequency (RF) receiver section electrically coupled to the channel extractor, wherein the RF receiver section includes an analog-to-digital converter (ADC) and a down converter, wherein the channel extractor comprises a first channel separator, wherein the first plurality of decoders is configured to decode each data signal portion of a first channel of the plurality of channel signals with a respective phase to generate a first plurality of decoded phase data signal portions, and the plurality of decoders is configured to decode each data signal portion of the first channel of the plurality of channel signals with a respective phase to generate a second plurality of decoded phase data signal portions.

16. The receiver of claim 15, further comprising a combiner electrically coupled with select decoders of the plurality of decoders, the combiner configured to collate a first decoded phase data signal portion of the first plurality of decoded phase data signal portions, associated with a first data signal of the first channel, and a second decoded phase data signal portion of the second plurality of decoded phase data signal portions, associated with the first data signal of the first channel, to generate a signal comprising the first data signal of the first channel.

17. The receiver of claim 16, wherein the plurality of decoders includes a plurality of time delay filters and a time delay filter of the plurality of time delay filters is electrically coupled with the combiner and configured to decode a time delay included in the signal comprising a first data beam of the first channel to obtain the first data signal of the first channel.

18. The receiver of claim 15, wherein the received signal is received by a first antenna of a phased array antenna, wherein a subset of plurality of antennas included in the phased array antenna electrically couple to the plurality of RF receiver sections, wherein the first antenna is included in the subset of plurality of antennas, and wherein a number of antennas in the subset of plurality of antennas equals a number of RF receiver sections of the plurality of RF receiver sections.

19. The receiver of claim 18, wherein the number of antennas in the subset of plurality of antennas equals M, a number of channels of the plurality of channels equals K, a number of data signals per channel equals N, and wherein a number of phase shifters of the plurality of phase shifters equals K×N×M.

20. The receiver of claim 19, wherein N data signals of a first channel of the K channels arrive at the subset of plurality of antennas from N different directions.

21. The receiver of claim 18, wherein the plurality of RF receiver sections, the plurality of channel extractors, and the plurality of decoders are included in a first integrated circuit (IC) chip, further comprising a second plurality of RF receiver sections, a second plurality of channel extractors, a second plurality of decoders included in a second IC chip different from the first IC chips, and
- further comprising a second subset of antennas, different from the subset of antennas, of the plurality of antennas of the phased array antenna, electrically coupled to the second IC chip.

* * * * *